(Model.)
E. D. MEAD.
MACHINE FOR SOWING FERTILIZERS.
No. 265,529. Patented Oct. 3, 1882.
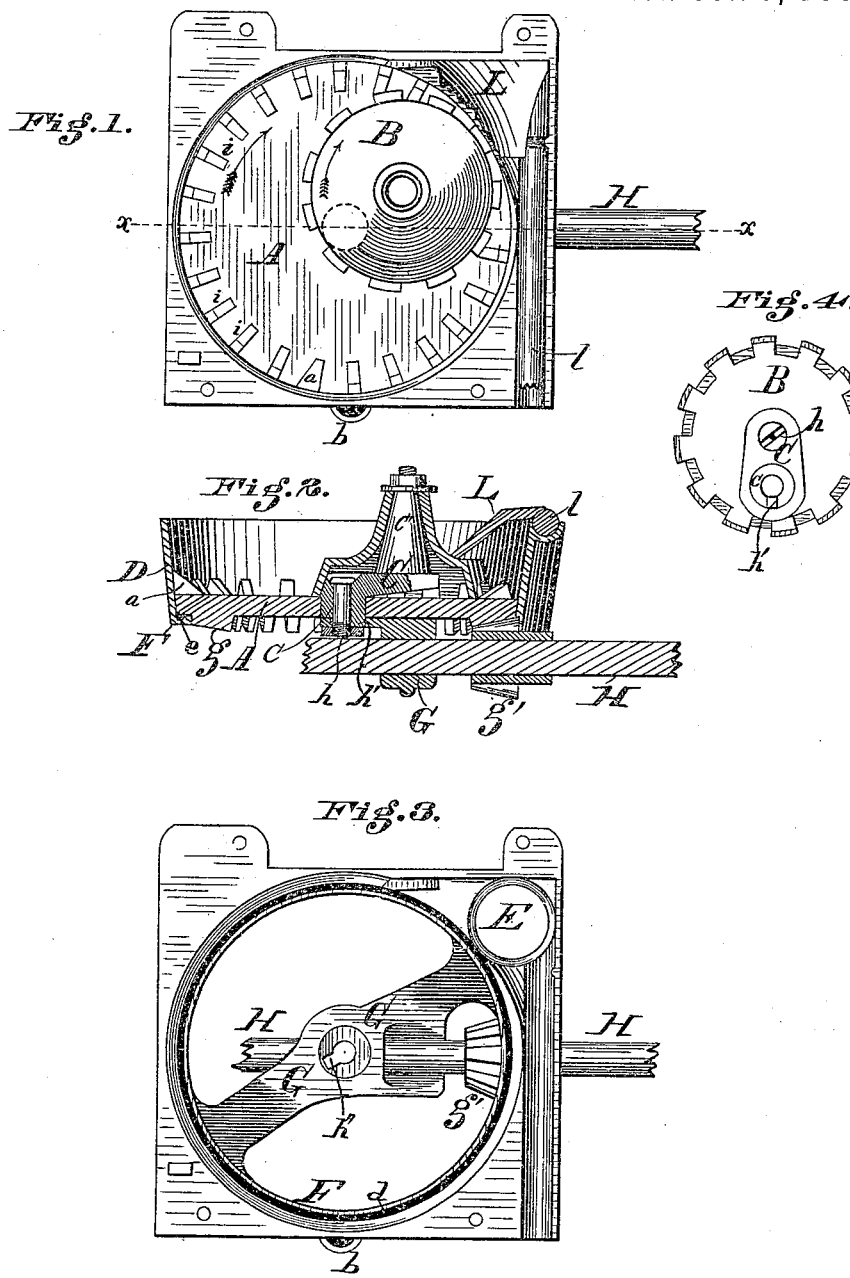

UNITED STATES PATENT OFFICE.

EDWIN D. MEAD, OF SHORTSVILLE, NEW YORK, ASSIGNOR OF ONE-HALF TO THE FARMERS FRIEND MANUFACTURING COMPANY, OF DAYTON, OHIO.

MACHINE FOR SOWING FERTILIZERS.

SPECIFICATION forming part of Letters Patent No. 265,529, dated October 3, 1882.

Application filed November 5, 1881. (Model.)

*To all whom it may concern:*

Be it known that I, EDWIN D. MEAD, a citizen of the United States, and a resident of Shortsville, in the county of Ontario and State of New York, have invented certain new and useful Improvements in Machines for Sowing Fertilizers, of which the following is a specification.

My invention relates to an improvement in machines for sowing fertilizers, and more particularly to that class which employs a rotating disk in combination with a revolving cleaner-wheel, as shown in Letters Patent granted to me August 19, 1879, my invention herein containing certain improvements upon said patent, and consisting, first, in providing a bent shaft containing a stud or crank upon each end thereof, one forming the axis for the revolving feed-wheel and the other stud forming the axis for the cleaning-wheel, which revolves eccentrically to the center of motion of the distributing or feed wheel.

My invention further consists in adapting the arm of the bent axle, which lies within the concavity of the cleaner-wheel, to act as a scraper to scrape off material sticking to the concave surface.

My invention further consists in a gate or cut-off valve which is placed above the discharge-orifice and oscillates vertically over the discharge-orifice and cleaner-wheel, so as to regulate the flow of the fertilizing material through the orifice.

My invention further consists in providing an annular peripheral bearing for the distributing-disk, in combination with an oil-cup on the outside of the feed cup or hopper, and connected to the annular bearing by an orifice pierced through the side walls and leading from the oil-cup to the annular bearing, so that the peripheral bearing of the feed-wheel can be readily supplied with oil from the outside of the hopper.

My invention further consists in providing on the peripheral edge of the rotating disk or feed-wheel a projecting lug, which fits close to the side wall of the feed-chamber and acts as a scraper to prevent the sticking of the fertilizer material to the side walls and clogging the machine.

My invention consists, finally, in placing the discharge-orifice inside the feed-cup, so as to be protected from the wind, which would otherwise blow the finely-powdered fertilizer material about.

My improvements will be more fully set forth in the following description of the accompanying drawings.

In the accompanying drawings, Figure 1 is a plan view of the feed-cup, showing the rotating disk or feed-wheel and the cleaner-wheel. Fig. 2 is a vertical section of the same on line $x$ $x$ of Fig. 1. Fig. 3 is a plan view of the feed-cup with the wheels removed, and showing the spider-arms underneath. Fig. 4 is a bottom plan of cleaner-wheel, showing the bent shaft or stud.

A represents the rotating disk or feed-wheel; B, the cleaner-wheel working upon it. C represents the bent shaft or stud; D, the side wall of feed-cup. $a$ represents the side scraper, which is preferably made by projecting outward and upward one of the carrying-teeth of the feed-wheel A. $b$ represents the oil-cup; $c$, the axle formed by the bent shaft or stud C upon which the wheel A revolves. $c'$ represents the pivot or axle by shaft C upon which the cleaner-wheel B revolves. $d$ represents the annular groove forming the peripheral bearing for wheel A; E, the discharge-orifice; $e$, a vertical flange upon the under side of the periphery of the disk or feed-wheel A, which works in the annular groove $d$. F represents a horizontal flange on the lower edge of the wall of the feed-chamber, upon which the disk A rests, and in which the annular groove $d$ is cast. G G represent the spider-arms. $g$ represents gearing on the under side of the periphery of disk A. $g'$ represents gearing upon the continuous shaft H, working into gearing $g$ and operating disk A. L represents the gate or cut-off valve; $l$, the rod which operates the gate L; $h$, a bolt or screw which secures the bent shaft or stud C to the spider-arms G.

My device has a lug, $h'$, on the lower end of the bent shaft or stud C, which fits into a correspondingly-shaped opening, $h''$, in the spider-arms, and holds it stationary, so as to prevent its turning with disk A. The upper side of the periphery of the wheel A is provided with a series of lugs or carrying-teeth, i i, perpendicular to the face of the wheel and meshing into the periphery of the cleaner-wheel B. The fertilizer material is carried around upon the face of the plate A in the direction of the arrow in the accompanying drawings, and all lumps are broken and crushed between the cleaner-wheel B and the side wall of the feed-chamber before it passes into the discharge-orifice E. By the rotation of the wheel B the fertilizer is forced into the orifice E.

The gate L, when down, fits closely over part of the top surface of the cleaner-wheel B, and acts as a scraper to keep the fertilizer from adhering to it.

The bent shaft C also fits closely to the inside of the periphery of the cleaner-wheel B, and acts as a scraper to prevent the material from sticking to the inner or concave surface of the wheel B.

Having thus described my invention, what I claim as new is as follows:

1. A bent shaft or stud, C, forming an eccentric axle, $c'$, for the cleaner-wheel B to revolve upon, and also forming an axle for the horizontal rotating disk or feed-wheel A, substantially as herein set forth.

2. In combination with the feed-wheel A and the concave cleaner-wheel B, the bent axle C, located within the concavity of wheel B, and acting as a scraper to prevent the sticking of the material to the wheel, substantially as herein set forth.

3. The combination, with feed and cleaner wheels, of the vertically-oscillating gate or cut-off L, with its rod $l$, located to oscillate over the cleaner-wheel and above the discharge-orifice E, and adapted, when down, to act as a scraper for the cleaner-wheel.

4. The combination, in a machine for sowing fertilizers, of the feed-wheel, with the oil-cup $b$ on the side wall, D, of the feed-chamber, connected by an orifice through said wall with the annular peripheral bearing of wheel A, whereby the parts are kept lubricated, substantially as herein described.

5. The horizontal revolving wheel A, having a series of lugs or starts for carrying the fertilizer arranged around upon the periphery of the wheel, with one or more of said lugs A projecting outwardly and acting as a scraper to scrape the fertilizer from the side walls of the feed-cup, to prevent the clogging of the feed wheel or disk, substantially as shown and described.

6. In a fertilizer-distributer, a metallic feed cup or hopper, with cylindrical sides D, and provided with the vertical discharge-orifice E, located within said feed-cup and abutting the peripheries of the wheels A and B, substantially as herein set forth.

7. The horizontal revolving wheel A, for carrying the fertilizer, revolving within a feed-cup and provided with an upwardly-projecting lug abutting the inner periphery of the feed-cup and acting as a scraper to clean the fertilizer from the side walls of the feed-cup and to prevent the sticking of the fertilizer to the walls thereof, substantially as shown and described.

8. A fertilizer-distributer composed essentially of a feed-cup having cylindrical sides and a feed disk or wheel revolving therein against such sides, the said feed-cup being cast or otherwise formed with a laterally-extending recess in one of its sides, which recess contains the vertically-discharging orifice, having its edge abutting the periphery of the feed-disk, substantially as shown and described.

In testimony whereof I have hereunto set my hand in the presence of two subscribing witnesses.

EDWIN D. MEAD.

Witnesses:
EDWARD BOYD,
EUGENE L. FIRNKOESS.